US012174583B2

(12) United States Patent
Watanabe et al.

(10) Patent No.: US 12,174,583 B2
(45) Date of Patent: Dec. 24, 2024

(54) ELECTROSTATIC CHARGE IMAGE DEVELOPING CARRIER, ELECTROSTATIC CHARGE IMAGE DEVELOPER, PROCESS CARTRIDGE, IMAGE FORMING APPARATUS AND IMAGE FORMING METHOD

(71) Applicant: FUJIFILM Business Innovation Corp., Tokyo (JP)

(72) Inventors: Takuro Watanabe, Minamiashigara (JP); Kazutsuna Sasaki, Minamiashigara (JP); Yosuke Tsurumi, Minamiashigara (JP); Yasuo Kadokura, Minamiashigara (JP); Karin Sakai, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 225 days.

(21) Appl. No.: 17/410,051

(22) Filed: Aug. 24, 2021

(65) Prior Publication Data

US 2022/0308485 A1 Sep. 29, 2022

(30) Foreign Application Priority Data

Mar. 23, 2021 (JP) ................................ 2021-049113

(51) Int. Cl.
*G03G 9/083* (2006.01)

(52) U.S. Cl.
CPC ......... *G03G 9/0839* (2013.01); *G03G 9/0834* (2013.01); *G03G 9/0836* (2013.01); *G03G 9/0837* (2013.01)

(58) Field of Classification Search
CPC .. G03G 9/0839; G03G 9/0834; G03G 9/0836; G03G 9/0837
See application file for complete search history.

(56) References Cited

U.S. PATENT DOCUMENTS

| | | | | |
|---|---|---|---|---|
| 8,455,168 | B2 * | 6/2013 | Kiyono | G03G 9/1134<br>430/111.4 |
| 9,304,427 | B2 * | 4/2016 | Iwatsuki | G03G 9/1137 |
| 2006/0291911 | A1 * | 12/2006 | Yamashita | G03G 9/1075<br>430/111.32 |
| 2011/0236813 | A1 | 9/2011 | Kiyono et al. | |

(Continued)

FOREIGN PATENT DOCUMENTS

| | | |
|---|---|---|
| JP | H06-266169 A | 9/1994 |
| JP | 7-181748 A | 7/1995 |

(Continued)

OTHER PUBLICATIONS

Communication dated Feb. 23, 2022 issued by the European Patent Office in application No. 21195636.2.

(Continued)

*Primary Examiner* — Peter L Vajda
*Assistant Examiner* — Boone Alexander Evans
(74) *Attorney, Agent, or Firm* — Sughrue Mion, PLLC

(57) ABSTRACT

An electrostatic charge image developing carrier includes a magnetic particle and a coating resin layer that covers the magnetic particle and contains a silica particle, and a ratio of Si on a surface of the coating resin layer, determined by an X-ray photoelectron spectroscopy (XPS), is 6 atom % or more and 12 atom % or less.

8 Claims, 2 Drawing Sheets

(56) References Cited

U.S. PATENT DOCUMENTS

| | | | | |
|---|---|---|---|---|
| 2016/0070193 | A1* | 3/2016 | Aga | G03G 9/1131 430/110.2 |
| 2017/0242354 | A1* | 8/2017 | Saito | G03G 9/1075 |
| 2018/0364602 | A1* | 12/2018 | Kadonome | G03G 9/08755 |
| 2019/0384201 | A1 | 12/2019 | Kadonome et al. | |
| 2020/0096888 | A1 | 3/2020 | Anno et al. | |
| 2020/0166862 | A1 | 5/2020 | Onozaki et al. | |

FOREIGN PATENT DOCUMENTS

| | | | |
|---|---|---|---|
| JP | H09-127737 | A | 5/1997 |
| JP | 2007-219118 | A | 8/2007 |
| JP | 2008-304745 | A | 12/2008 |
| JP | 2009-64003 | A | 3/2009 |
| JP | 2018-200372 | A | 12/2018 |
| JP | 2019-8000 | A | 1/2019 |
| JP | 2019-215478 | A | 12/2019 |
| JP | 202046463 | A | 3/2020 |
| JP | 202091471 | A | 6/2020 |

OTHER PUBLICATIONS

Office Action dated May 26, 2023, issued by the European Patent Office in counterpart European Patent Application No. 21 195 636.2.

Communication dated Oct. 8, 2024 from the Japanese Patent Office in Application No. 2021-049113.

* cited by examiner

ELECTROSTATIC CHARGE IMAGE DEVELOPING CARRIER, ELECTROSTATIC CHARGE IMAGE DEVELOPER, PROCESS CARTRIDGE, IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2021-049113 filed on Mar. 23, 2021.

BACKGROUND

Technical Field

The present invention relates to an electrostatic charge image developing carrier, an electrostatic charge image developer, a process cartridge, an image forming apparatus, and an image forming method.

Related Art

Methods for visualizing image information such as electrophotography are currently used in various fields. In the electrophotography, an electrostatic charge image is formed as image information on a surface of an image carrier by charging and electrostatic charge image formation. Then, a toner image is formed on the surface of the image carrier by a developer containing a toner, transferred to a recording medium, and then fixed to the recording medium. Through these steps, the image information is visualized as an image.

For example, JP-A-2018-200372 discloses "an electrostatic latent image developing carrier including: plural carrier particles each including a carrier core; and a first coat layer and second coat layer that cover a surface of the carrier core, in which the first coat layer and the second coat layer have a laminated structure in which the first coat layer and the second coat layer are laminated in this order from the surface of the carrier core, the first coat layer contains a first thermosetting resin, the second coat layer contains a second thermosetting resin, surface adsorbability of the first coat layer is 70 nN or more and 100 nN or less, and pencil hardness of the second coat layer is 2H or more and 6H or less."

JP-A-2007-219118 discloses "a two-component developer including: a toner having a volume median particle diameter of 3 μm to 8 μm, the toner being obtained by adhering inorganic fine particles to colored particles; and a carrier having a mass average particle diameter of 20 μm to 40 μm, the carrier being obtained by adhering the inorganic fine particles thereto, in which an area ratio measured by an X-ray analyzer on a carrier surface of an element (A) constituting the inorganic fine particles adhered to the toner is 0.5 area % to 3.0 area %."

JP-A-2008-304745 discloses "an electrostatic charge image developer containing a carrier having a coating resin layer on a carrier core material and a toner, in which the carrier contains 7 mass % to 35 mass % of silica or carbon black in the coating resin layer, a coating resin has a weight average molecular weight (Mw) of 300,000 to 600,000, and the toner contains external additive fine particles having a number average particle diameter of 70 nm to 300 nm."

JP-A-H07-181748 discloses a "two-component developer for developing an electrostatic latent image, including: a coat carrier obtained by applying a coating film to at least a core particle; and a toner containing at least a binder resin, a colorant, and a polarity control agent and obtained by externally adding an inorganic fine powder to particles having a volume average particle diameter of 5 μm to 10 μm, in which as shown in accompanying drawings, when a horizontal axis represents surface hardness (pencil hardness in a pencil scratch test defined by JIS K5400) of the coat carrier and a vertical axis represents a product of a square root of a specific surface area in a BET method of an external additive for the toner and an addition amount (wt %) of the external additive for the toner relative to the toner, these relations are within a range surrounded by points A, B, C, and D."

SUMMARY

Aspects of non-limiting embodiments of the present disclosure relate to providing an electrostatic charge image developing carrier that includes a magnetic particle and a coating resin layer that covers the magnetic particle and contains a silica particle, and gives excellent toner charge maintainability, as compared with a case where a ratio of Si on a surface of the coating resin layer, determined by an X-ray photoelectron spectroscopy (XPS), is less than 6 atom % or exceeds 12 atom %.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing carrier including:

a magnetic particle; and a coating resin layer that covers the magnetic particle and contains a silica particle, in which a ratio of Si on a surface of the coating resin layer, determined by an X-ray photoelectron spectroscopy (XPS), is 6 atom % or more and 12 atom % or less.

BRIEF DESCRIPTION OF THE DRAWINGS

Exemplary embodiment(s) of the present invention will be described in detail based on the following figures, wherein.

DETAILED DESCRIPTION

Figure 1:
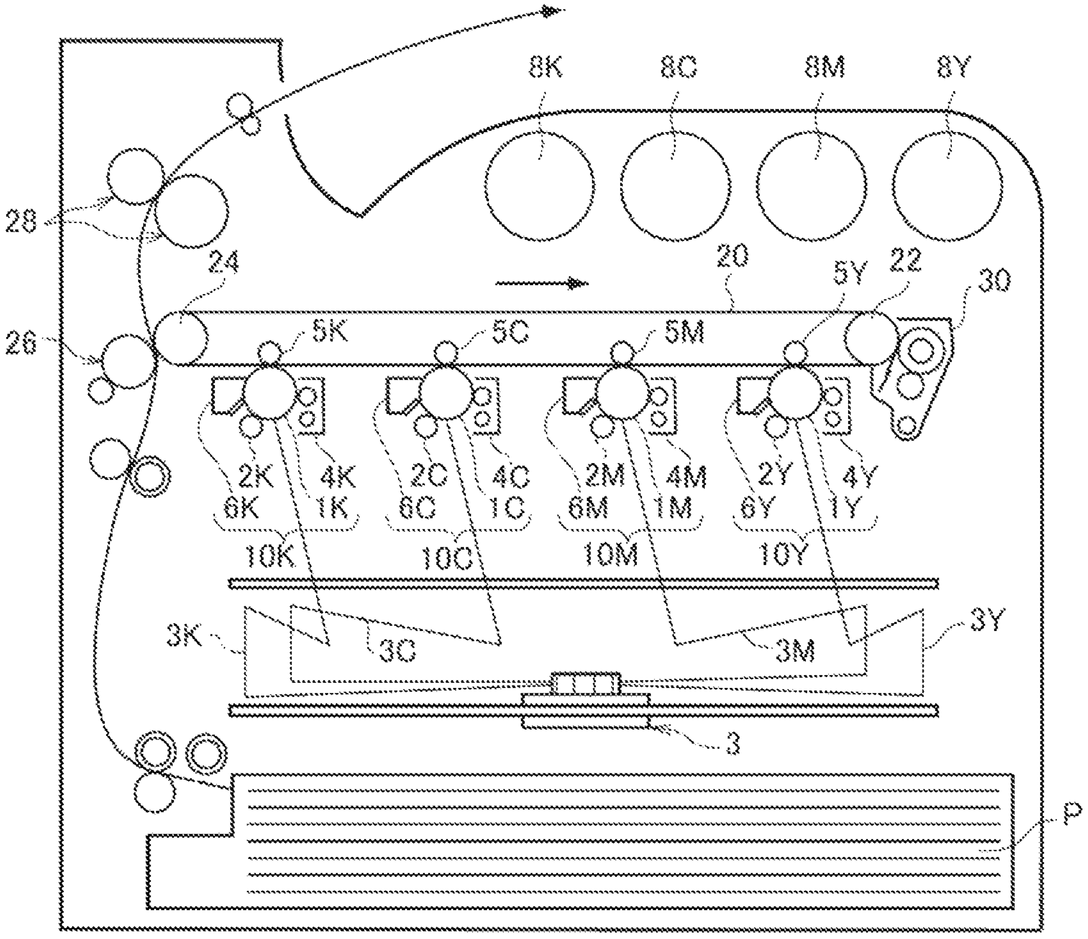
FIG. 1 is a schematic configuration diagram illustrating an example of an image forming apparatus according to the exemplary embodiment.

Hereinafter, an exemplary embodiment as an example of the present disclosure will be described. These descriptions and examples illustrate the present disclosure and do not limit the present disclosure.

In the present description, a numerical range indicated by "to" indicates a range including numerical values before and after "to" as a minimum value and a maximum value, respectively.

In the numerical ranges described in stages in the present description, an upper limit or a lower limit described in one numerical range may be replaced with an upper limit or a lower limit of the numerical range described in other stages. In the numerical ranges described in the present disclosure, the upper limit or the lower limit of the numerical range may be replaced with values shown in Examples.

In the present description, the term “step” indicates not only an independent step, and even when a step cannot be clearly distinguished from other steps, this step is included in the term “step” as long as the intended purpose of the step is achieved.

In the description of an exemplary embodiment with reference to drawings, a configuration of the exemplary embodiment is not limited to a configuration illustrated in the drawings. Sizes of members in each drawing are conceptual, and a relative size relation between the members is not limited to this.

In the present description, each component may include plural corresponding substances. In the present disclosure, in a case of referring to an amount of each component in a composition, when there are plural substances corresponding to each component in the composition, unless otherwise specified, it refers to a total amount of the plural substances included in the composition.

In the present description, each component may include plural corresponding particles. When there are plural kinds of particles corresponding to each component in a composition, unless otherwise specified, a particle diameter of each component means a value for a mixture of the plural kinds of particles included in the composition.

In the present description, the term “(meth)acryl” means at least one of acryl and methacryl, and the term “(meth) acrylate” means at least one of acrylate and methacrylate.

In the present description, the term “electrostatic charge image developing toner” may be simply referred to as a “toner”, the term “electrostatic charge image developing carrier” may be simply referred to as a “carrier”, and the term “electrostatic charge image developer” may be simply referred to as a “developer”.

<Electrostatic Charge Image Developing Carrier>

First Exemplary Embodiment

A carrier according to the first exemplary embodiment includes a magnetic particle and a coating resin layer that covers the magnetic particle and contains a silica particle.

A ratio of Si on a surface of the coating resin layer, determined by an X-ray photoelectron spectroscopy (XPS), is 6 atom % or more and 12 atom % or less.

The carrier according to the first exemplary embodiment gives excellent toner charge maintainability according to the above configuration. The reasons are presumed as follows.

The toner and the carrier are stirred in a coexisting state in a developing unit, thereby charging the toner.

However, when the toner and the carrier are continuously stirred, an external additive (particularly, silica particles) for the toner adheres to the carrier. When an amount of the external additive attached to the carrier increases, chargeability of the carrier decreases over time, and a charging characteristic of the toner decreases.

Therefore, in the carrier according to the first exemplary embodiment, the ratio of Si on the surface of the coating resin layer is controlled to 6 atom % or more and 12 atom % or less.

In the case where the ratio of Si on the surface of the coating resin layer containing the silica particle is within the above range, the silica particle is appropriately exposed on the surface of the coating resin layer to give the fine unevenness, so that a contact area with the external additive is reduced, and a physical adhesive force of the coating resin layer to the external additive is reduced.

In addition, since the silica particle is commonly used as an external additive for a toner, the silica particle appropriately exposed on the surface of the coating resin layer reduces an electrostatic adhesive force of the coating resin layer to the silica particle as the external additive.

Therefore, even if the silica particle once adheres to the carrier, the silica particle is easily separated and a decrease in chargeability is prevented. Therefore, the toner charge maintainability is increased.

From the above, it is presumed that the carrier according to the first exemplary embodiment gives excellent toner charge maintainability.

Second Exemplary Embodiment

A carrier according to the second exemplary embodiment includes a magnetic particle and a coating resin layer that covers the magnetic particle and contains a silica particle.

An area ratio of the silica particle exposed on a surface of the coating resin layer is 10% or more and 50% or less.

The carrier according to the second exemplary embodiment also gives excellent toner charge maintainability according to the above configuration. The reason for this is presumed to be the same as in the first exemplary embodiment.

That is, in the case where the area ratio of the silica particle exposed on the surface of the coating resin layer is within the above range, the silica particle is appropriately exposed on the surface of the coating resin layer. Therefore, the physical and electrostatic adhesive force to the external additive is reduced, and a decrease in chargeability of the carrier is prevented.

From the above, it is presumed that the carrier according to the second exemplary embodiment gives excellent toner charge maintainability.

Hereinafter, a carrier corresponding to any of the carriers according to the first and second exemplary embodiments (hereinafter, also referred to as “the carrier according to the exemplary embodiment”) will be described in detail. However, an example of the carrier in the present disclosure may be a carrier corresponding to any of the carriers according to the first and second exemplary embodiments.

Hereinafter, the carrier according to the exemplary embodiment will be described in detail.

(Ratio of Si on Surface of Coating Resin Layer)

The ratio of Si on the surface of the coating resin layer, determined by the X-ray photoelectron spectroscopy (XPS), is 6 atom % or more and 12 atom % or less, and is preferably 7 atom % or more and 11 atom % or less, and more preferably 8 atom % or more and 10 atom % or less, from a viewpoint of improving the toner charge maintainability.

The ratio of Si on the surface of the coating resin layer may be controlled by an amount of the silica particle contained in the coating resin layer, and the ratio of Si on the surface of the coating resin layer becomes higher as the amount of the silica particle relative to the resin increases.

Here, the ratio of Si on the surface of the coating resin layer is measured as follows.

The carrier is used as a sample and analyzed by X-ray Photoelectron Spectroscopy (XPS) under the following conditions, and peak intensities of all the elements are measured. Then, the ratio (atomic %) of Si is acquired from the obtained peak intensities of all the elements.

XPS device: Versa Probe II manufactured by ULVAC-PHI, Inc.

Etching gun: argon gun

Acceleration voltage: 5 kV

Emission current: 20 mA

Spatter area: 2 mm×2 mm

Sputter rate: 3 nm/min (in terms of $SiO_2$)

(Area Ratio of Silica Particle)

The area ratio of the silica particle exposed on the surface of the coating resin layer is 10% or more and 50% or less, and from the viewpoint of improving the toner charge maintainability, the area ratio is preferably 10% or more and 40% or less, and more preferably 15% or more and 35% or less.

The area ratio of the silica particles may be controlled by the amount of the silica particle contained in the coating resin layer, and the area ratio of the silica particle becomes higher as the amount of the silica particle relative to the resin increases.

Here, the area ratio of the silica particles is measured as follows.

The carrier is embedded in an epoxy resin and cut with a microtome, and a sample having a carrier cross section as an observation surface is prepared. An SEM image (magnification: 20,000 times) obtained by capturing a cross section of the coating resin layer in the carrier cross section with a scanning electron microscope (SEM) is taken into an image processing analyzer for image analysis.

In the SEM image of the carrier cross section, an area of the silica particle in the cross section of the coating resin layer is measured, and the area ratio of the silica particle is calculated by the following equation:

$$\text{Area ratio of silica particle} = \text{Total area of silica particle}/\text{Area of the coating resin layer} \times 100.$$

Identification of the silica particle in the cross section of the coating resin layer is performed by energy dispersive X-ray spectroscopy (SEM-EDX).

In the carrier according to the exemplary embodiment, in order to satisfy the ratio of Si and the area ratio of the silica particle, the carrier may be one in the following exemplary embodiment.

(Configuration of Carrier)

A carrier according to the exemplary embodiment includes a magnetic particle and a coating resin layer that covers the magnetic particle.

<<Magnetic Particle>>

The magnetic particle is not particularly limited, and common magnetic particles used as a core material of the carrier may be used. Specific examples of the magnetic particle include: particles of a magnetic metal such as iron, nickel, or cobalt; particles of a magnetic oxide such as ferrite or magnetite; resin-impregnated magnetic particles obtained by impregnating a porous magnetic powder with a resin; and magnetic powder-dispersed resin particles in which a magnetic powder is dispersed and blended in a resin. The ferrite particle may be used as the magnetic particle in the exemplary embodiment.

A volume average particle diameter of the magnetic particles may be 15 μm or more and 100 μm or less, and is preferably 20 μm or more and 80 μm or less, and more preferably 30 μm or more and 60 μm or less.

The volume average particle diameter of the magnetic particle is measured by the following method.

A particle size distribution is measured using a laser diffraction/scattering particle size distribution measuring device (LS Particle Size Analyzer (manufactured by Beckman Coulter, Inc.)). As an electrolytic solution, ISOTON-II (manufactured by Beckman Coulter, Inc.) is used. The number of particles to be measured is 50,000.

Then, as for the measured particle size distribution, a cumulative distribution of a volume is drawn from a small diameter side with respect to a divided particle size range (channel), and a particle diameter (D50v) at 50% accumulation is defined as the "volume average particle diameter".

The arithmetic average height Ra (JIS B0601: 2001) of the roughness curve of the magnetic particles is obtained by observing the magnetic particles at an appropriate magnification (for example, a magnification of 1000 times) using a surface profile measurement apparatus (for example, "Ultra Depth Color 3D profile measurement microscope VK-9700" manufactured by Keyence Corporation), obtaining a roughness curve at a cutoff value of 0.08 mm, and extracting a reference length of 10 μm from the roughness curve in a direction of an average line thereof. The arithmetic average value of Ra of 100 magnetic particles may be 0.1 μm or more and 1 μm or less, and is preferably 0.2 μm or more and 0.8 μm or less.

As for a magnetic force of the magnetic particles, saturation magnetization in a magnetic field of 3,000 Oersted may be 50 emu/g or more, and is preferably 60 emu/g or more. The saturation magnetization is measured using a vibration sample type magnetic measurement apparatus VSMP10-15 (manufactured by Toei Industry Co., Ltd.). A measurement sample is packed in a cell having an inner diameter of 7 mm and a height of 5 mm and set in the apparatus. The measurement is performed by applying a magnetic field and sweeping up to 3,000 Oersted. Next, the applied magnetic field is reduced to create a hysteresis curve on a recording sheet. The saturation magnetization, residual magnetization, and a holding force are obtained from data of the curve.

A volume electric resistance (volume resistivity) of the magnetic particles may be $1\times10^5$ Ω·cm or more and $1\times10^9$ Ω·cm or less, and is preferably $1\times10^7$ Ω·cm or more and $1\times10^9$ Ω·cm or less.

The volume electric resistance (Ω·cm) of the magnetic particles is measured as follows. A layer is formed by flatly placing an object to be measured on a surface of a circular jig on which a 20 $cm^2$ electrode plate is arranged so as to have a thickness of 1 mm or more and 3 mm or less. Another 20 $cm^2$ electrode plate is placed thereon to sandwich the layer therebetween. The thickness (cm) of the layer is measured after applying a load of 4 kg is applied to the electrode plate arranged on the layer to eliminate voids between the object to be measured and the electrode plates. Both electrodes above and below the layer are connected to an electrometer and a high voltage power generator, respectively. A high voltage is applied to both electrodes such that an electric field is 103.8 V/cm, and a current value (A) flowing at this time is read. A measurement environment is under a temperature of 20° C. and a relative humidity of 50%. An equation for calculating the volume electric resistance (Ω·cm) of the object to be measured is as shown in the following equation.

$$R=E\times20/(I-I_0)/L$$

In the above equation, R represents the volume electric resistance (Ω·cm) of the object to be measured, E represents the applied voltage (V), I represents the current value (A), $I_0$ represents a current value (A) at an applied voltage of 0 V, and L represents the thickness (cm) of the layer. The coefficient 20 represents the area ($cm^2$) of the electrode plate.

<<Coating Resin Layer>>

The coating resin layer contains a resin. Then, the coating resin layer contains a silica particle.

—Resin—

Examples of the resin contained in the coating resin layer include styrene-acrylic resin; polyolefin-based resins such as polyethylene and polypropylene; polyvinyl-based or polyvinylidene-based resins such as polystyrene, an acrylic resin, polyacrylonitrile, polyvinyl acetate, polyvinyl alcohol, polyvinyl butyral, polyvinyl chloride, polyvinylcarbazole, polyvinyl ether, and polyvinylketone; a vinyl chloride-vinyl acetate copolymer; straight silicone resins including an organosiloxane bond, or a modified product thereof; fluororesins such as polytetrafluoroethylene, polyvinyl fluoride, polyvinylidene fluoride, and polychlorotrifluoroethylene; polyester; polyurethane; polycarbonate; amino resins such as urea and formaldehyde resins; and epoxy resins.

The coating resin layer may contain an acrylic resin having an alicyclic structure. A polymerization component of the acrylic resin having an alicyclic structure may be a lower alkyl ester of (meth)acrylic acid (for example, (meth) acrylic acid alkyl ester having an alkyl group having 1 to 9 carbon atoms), and specific examples thereof include methyl (meth)acrylate, ethyl (meth)acrylate, propyl (meth)acrylate, butyl (meth)acrylate, hexyl (meth)acrylate, cyclohexyl (meth)acrylate, and 2-ethylhexyl (meth)acrylate. These monomers may be used alone or in combination of two or more kinds thereof.

The acrylic resin having an alicyclic structure may contain cyclohexyl (meth)acrylate as the polymerization component. A content of a monomer unit derived from the cyclohexyl (meth)acrylate contained in the acrylic resin having an alicyclic structure may be 75 mass % or more and 100 mass % or less, and is preferably 85 mass % or more and 100 mass % or less, and more preferably 95 mass % or more and 100 mass % or less, relative to a total mass of the acrylic resin having an alicyclic structure.

The weight average molecular weight of the resin contained in the coating resin layer may be less than 300,000, and is preferably less than 250,000, and more preferably less than 200,000.

In the case where the weight average molecular weight of the resin contained in the coating resin layer is reduced to fall within the above range, since adhesion to the magnetic particle is high and the coating resin layer is less likely to peel off when image formation is repeated, charged sites are maintained. Therefore, the toner charge maintainability is further improved.

However, in terms of the lower limit of the weight average molecular weight of the resin contained in the coating resin layer, the weight average molecular weight thereof may be 50,000 or more, and is preferably 100,000 or more, from the viewpoint of the adhesion to the magnetic particles.

Here, the weight average molecular weight is measured by gel permeation chromatography (GPC). Molecular weight measurement by GPC is performed by using a measurement device GPCHLC-8120 manufactured by Tosoh Corporation, a column TSKgel SuperHM-M (15 cm) manufactured by Tosoh Corporation, and a THF solvent. The weight average molecular weight is determined from the measurement result using a molecular weight calibration curve prepared using a monodispersed polystyrene standard sample.

—Silica Particle—

Examples of the silica particle include a dry silica particle and a wet silica particle.

Examples of the dry silica particle include combusted silica (fumed silica) obtained by combusting a silane compound, deflagrated silica obtained by explosively combusting a metal silicon powder, and the like.

Examples of the wet silica particle include a wet silica particle obtained by a neutralization reaction of sodium silicate and mineral acid (e.g. precipitated silica obtained through synthesis and aggregation under an alkali condition, a gel method silica particle obtained through synthesis and aggregation under an acidic condition, and the like), a colloidal silica particle (silica sol particle or the like) obtained through polymerization of acidic silicic acid under an alkaline condition, and sol-gel method silica particles obtained by hydrolysis of an organic silane compound (for example, alkoxysilane).

Surfaces of the silica particle may be subjected to a hydrophobic treatment. Examples of the hydrophobic treatment agent include common organic silicon compounds having an alkyl group (for example, a methyl group, an ethyl group, a propyl group, a butyl group, or the like), and specific examples thereof include an alkoxysilane compound, a siloxane compound, and a silazane compound. Among these, the hydrophobic treatment agent is preferably a silazane compound, and preferably hexamethyldisilazane. The hydrophobic treatment agent may be used alone or in combination of two or more kinds thereof.

Examples of a method for hydrophobizing the silica particles with the hydrophobic treatment agent include a method in which supercritical carbon dioxide is used and the hydrophobic treatment agent is dissolved in the supercritical carbon dioxide to be attached to the surfaces of the silica particles, a method in which a solution containing a hydrophobic treatment agent and a solvent for dissolving the hydrophobic treatment agent is applied (for example, by spraying or coating) to the surfaces of the silica particles in the atmosphere to attach the hydrophobic treatment agent to the surfaces of the silica particles, and a method in which a solution containing a hydrophobic treatment agent and a solvent for dissolving the hydrophobic treatment agent is added to and held in an silica particle dispersion liquid in the air, and then a mixed solution of the above solution and the silica particle dispersion liquid is dried.

A content of the silica particle contained in the coating resin layer may be 20 mass % or more and 50 mass % or less, and is preferably 25 mass % or more and 45 mass % or less, more preferably 25 mass % or more and 40 mass % or less, and still more preferably 30 mass % or more and 40 mass % or less, relative to a total mass of the coating resin layer.

In the case where a large amount of silica particles are contained in the coating resin layer within the above range, fine unevenness due to the silica particles is made in the surface of the coating resin layer, and the adhesive force of the carrier to the external additive is reduced. As a result, the toner charge maintainability is further improved.

The coating resin layer may contain a conductive particle for a purpose of controlling charging or resistance. Examples of the conductive particles include carbon black and particles that have conductivity and are described above as the silica particle.

—Forming Method of Coating Resin Layer—

Examples of a method for forming the coating resin layer on the surface of the magnetic particles include a wet production method and a dry production method. The wet production method is a production method using a solvent that dissolves or disperses the resin constituting the coating resin layer. On the other hand, the dry production method is a production method that does not use the above solvent.

Examples of the wet production method include an immersion method in which the magnetic particles are immersed in a resin liquid for forming the coating resin layer to perform coating, a spray method in which a resin liquid for forming the coating resin layer is sprayed on the surfaces of the magnetic particles, a fluidized bed method in which a resin liquid for forming the coating resin layer is sprayed while fluidizing the magnetic particles in a fluidized bed, and a kneader coater method in which the magnetic particles and a resin liquid for forming the coating resin layer are mixed in a kneader coater to remove a solvent. These production methods may be repeated or combined.

The resin liquid for forming the coating resin layer used in the wet production method is prepared by dissolving or dispersing a resin, silica particles, and other components in a solvent. The solvent is not particularly limited, and for example, aromatic hydrocarbons such as toluene and xylene, ketones such as acetone and methyl ethyl ketone, and ethers such as tetrahydrofuran, dioxane, or the like may be used.

Examples of the dry production method include a method of forming the coating resin layer by heating a mixture of the magnetic particles and a resin for forming the coating resin layer in a dry state. Specifically, for example, the magnetic particles and the resin for forming the coating resin layer are mixed in a gas phase and heated and melted to form the coating resin layer.

(Average Particle Diameter of Silica Particle/Average Thickness of Coating Resin Layer)

In the carrier according to the exemplary embodiment, the average particle diameter of the silica particle may be smaller than the average thickness of the coating resin layer.

Specifically, the ratio of the average particle diameter of the silica particle to the average thickness of the coating resin layer (average particle diameter of silica particle/average thickness of coating resin layer) may be 0.005 or more and 0.1500 or less, and is preferably 0.007 or more and 0.05 or less.

In the case where the average particle diameter of the silica particle is smaller than the average thickness of the coating resin layer and the silica particle is dispersed in the coating resin layer and exposed from the coating resin layer, the fine unevenness is made in the surface of the coating resin layer by the silica particle, and the adhesive force of the carrier to the external additive is reduced. As a result, the toner charge maintainability is further improved.

The average particle diameter of the silica particle may be 5 nm or more and 90 nm or less, and is preferably 5 nm or more and 70 nm or less, more preferably 5 nm or more and 50 nm or less, and still more preferably 8 nm or more and 50 nm or less, from the viewpoint of improving the toner charge maintainability.

The average particle diameter of the silica particle contained in the coating resin layer may be controlled by a size of the silica particle used for forming the coating resin layer.

The average thickness of the coating resin layer may be 0.6 μm or more and 1.4 μm or less, and is preferably 0.8 μm or more and 1.2 μm or less, and more preferably 0.8 μm or more and 1.1 μm or less, from the viewpoint of improving the toner charge maintainability.

The average thickness of the coating resin layer may be controlled by an amount of the resin used for forming the coating resin layer, and the average thickness of the coating resin layer increases as the amount of the resin relative to the amount of the magnetic particle increases.

Here, the average particle diameter of the silica particle contained in the coating resin layer and the average thickness of the coating resin layer are measured by the following method.

The carrier is embedded in an epoxy resin and cut with the microtome, and the sample having the carrier cross section as the observation surface is prepared. As for the carrier cross section, the scanning electron microscope (SEM) image (magnification: 20,000 times) obtained by capturing the cross section of the coating resin layer with the SEM is taken into the image processing analyzer for image analysis. 100 silica particles (primary particles) in the coating resin layer are randomly selected, and an equivalent circular diameter (nm) of each particle is determined and arithmetically averaged to obtain the average particle diameter (nm) of the silica particle. The thickness (μm) of the coating resin layer is measured as follows: 10 points per particle of the carrier are randomly selected, and 100 particles of the carrier are further selected to measure thicknesses thereof, and all the thicknesses are arithmetically averaged to obtain the average thickness (μm) of the coating resin layer.

(Characteristics of Carrier)

—Average Length RSm of Roughness Curve Element—

The average length RSm of the roughness curve element of the carrier surface according to the exemplary embodiment is "average length RSm of roughness curve element" in JIS B0601: 2001. The average length RSm of the roughness curve element of the carrier surface may be 0.1 μm or more and 1.2 μm or less, and is preferably 0.3 μm or more and 1.0 μm or less, and more preferably 0.5 μm or more and 0.8 μm or less.

In the case where the average length RSm of the roughness curve element of the carrier surface is within the above range, appropriate fine unevenness is made in the carrier surface (that is, the surface of the coating resin layer), and the adhesive force of the carrier to the external additive is reduced. As a result, the toner charge maintainability is further improved.

The average length RSm of the roughness curve element of the carrier surface is determined by performing image analysis using a resin coated carrier as a sample with a laser microscope (VK-9500, manufactured by Keyence Corporation) in accordance with the measurement method described in JIS B0601: 2001.

—Arithmetic Average Height Ra of Roughness Curve—

The arithmetic average height Ra (JIS B0601:2001) of the roughness curve of the carrier surface according to the exemplary embodiment may be 0.1 μm or more and 1.0 μm or less, and is preferably 0.2 μm or more and 0.8 μm or less.

In the case where the arithmetic average height Ra of the roughness curve of the carrier is within the above range, appropriate fine unevenness is made in the carrier surface (that is, the surface of the coating resin layer), and the adhesive force of the carrier to the external additive is reduced. As a result, the toner charge maintainability is further improved.

The arithmetic average height Ra of the roughness curve of the carrier surface is determined by observing the carrier at an appropriate magnification (for example, a magnification of 1,000 times) using a surface profile measuring apparatus (for example, "Ultra Depth Color 3D profile measurement microscope VK-9700" manufactured by Keyence Corporation), obtaining a roughness curve at a cutoff value of 0.08 mm, and extracting a reference length of 10 μm from the roughness curve in a direction of an average line thereof.

Ra of 100 carriers is arithmetically averaged.

—Exposed Area Ratio of Magnetic Particle—

An exposed area ratio of the magnetic particle on a carrier surface according to the exemplary embodiment may be 5% or more and 30% or less, and is preferably 7% or more and 25% or less, and more preferably 10% or more and 25% or less. The exposed area ratio of the magnetic particles in the carrier may be controlled by the amount of the resin used for forming the coating resin layer, and the exposed area ratio becomes smaller as the amount of the resin relative to the amount of the magnetic particle increases.

The exposed area ratio of the magnetic particle on the carrier surface is a value obtained by the following method.

A target carrier and the magnetic particle obtained by removing the coating resin layer from the target carrier are prepared. Examples of a method for removing the coating resin layer from the carrier include a method of dissolving a resin component in an organic solvent to remove the coating resin layer, a method of removing the resin component by heating at about 800° C. to remove the coating resin layer, and the like. The carrier and the magnetic particle are used as measurement samples, and Fe concentrations (atomic %) on surfaces of the samples are quantified by XPS, and "(Fe concentration of the carrier)/(Fe concentration of the magnetic particle)×100" is calculated, and the calculated value is defined as the exposed area ratio (%) of the magnetic particle.

A volume average particle diameter of the carrier according to the exemplary embodiment may be 10 μm or more and 120 μm or less, and is preferably 20 μm or more and 100 μm or less, and more preferably 30 μm or more and 80 μm or less.

The volume average particle diameter of the carrier means the particle diameter D50v at 50% accumulation from the small diameter side in a particle size distribution based on volume, and is measured by the same method as the volume average particle diameter of the magnetic particle.

<Electrostatic Charge Image Developer>

The developer according to the exemplary embodiment is a two-component developer containing the carrier according to the exemplary embodiment and a toner. The toner contains a toner particle and, if necessary, an external additive.

A mixing ratio (mass ratio) of the carrier and the toner in the developer may be carrier:toner=100:1 to 100:30, and is preferably 100:3 to 100:20.

<<Toner Particles>>

The toner particle contains, for example, a binder resin, and if necessary, a colorant, a releasing agent, and other additive(s).

—Binder Resin—

Examples of the binder resin include vinyl-based resins made of a homopolymer of monomers such as styrenes (such as styrene, parachlorostyrene, and α-methylstyrene), (meth)acrylic acid esters (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), and a copolymer obtained by combining two or more kinds of these monomers.

Examples of the binder resin include non-vinyl-based resins such as an epoxy resin, a polyester resin, a polyurethane resin, a polyamide resin, a cellulose resin, a polyether resin, and a modified resin, a mixture of the non-vinyl-based resin and the vinyl-based resin, and a graft polymer obtained by polymerizing a vinyl-based monomer in the presence of the non-vinyl-based resin.

The binder resin may be used alone or in combination of two or more thereof.

The binder resin is suitably a polyester resin.

Examples of the polyester resin include common amorphous polyester resins. As the polyester resin, a crystalline polyester resin may be used in combination with the amorphous polyester resin. However, the crystalline polyester resin may be used in an amount of 2 mass % or more and 40 mass % or less (preferably 2 mass % or more and 20 mass % or less) relative to a total amount of the binder resin.

"Crystalline" of a resin refers to one having a clear endothermic peak rather than a stepwise endothermic amount change in differential scanning calorimetry (DSC), and specifically means one having a half width of the endothermic peak when measured at a heating rate of 10 (° C./min) being within 10° C.

On the other hand, "amorphous" of a resin means one having a half width of higher than 10° C., showing a stepwise endothermic change, or not showing a clear endothermic peak.

Amorphous Polyester Resin

Examples of the amorphous polyester resin include a condensed polymer of a polycarboxylic acid and a polyhydric alcohol. As the amorphous polyester resin, a commercially available product may be used, or a synthetic resin may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl esters thereof (for example, having 1 to 5 carbon atoms). Among these, the polycarboxylic acid is preferably, for example, an aromatic dicarboxylic acid.

As for the polycarboxylic acid, a tricarboxylic acid or higher carboxylic acid having a cross-linked structure or a branched structure may be used in combination with the dicarboxylic acid. Examples of the tricarboxylic acid or higher carboxylic acid include trimellitic acid, pyromellitic acid, anhydrides thereof, and lower alkyl esters thereof (for example, having 1 to 5 carbon atoms).

The polycarboxylic acid may be used alone or in combination of two or more kinds thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). Among these, the polyhydric alcohol is preferably, for example, an aromatic diol or an alicyclic diol, and more preferably an aromatic diol.

As the polyhydric alcohol, a trihydric alcohol or higher polyhydric alcohol having a cross-linked structure or a branched structure may be used in combination with a diol. Examples of the trihydric alcohol or higher polyhydric alcohol include glycerin, trimethylolpropane, and pentaerythritol.

The polyhydric alcohol may be used alone or in combination of two or more thereof.

A glass transition temperature (Tg) of the amorphous polyester resin may be 50° C. or higher and 80° C. or lower, and is preferably 50° C. or higher and 65° C. or lower.

The glass transition temperature is obtained from a differential scanning calorimetry (DSC) curve obtained by the DSC, and is more specifically obtained by the "extrapolated glass transition onset temperature" described in the method for obtaining the glass transition temperature in "Method for measuring glass transition temperature of plastics" in JIS K 7121:1987.

A weight average molecular weight (Mw) of the amorphous polyester resin may be 5,000 or more and 1,000,000 or less, and is preferably 7,000 or more and 500,000 or less.

A number average molecular weight (Mn) of the amorphous polyester resin may be 2,000 or more and 100,000 or less.

A molecular weight distribution Mw/Mn of the amorphous polyester resin may be 1.5 or more and 100 or less, and is preferably 2 or more and 60 or less.

The weight average molecular weight and the number average molecular weight are measured by gel permeation chromatography (GPC). Molecular weight measurement by GPC is performed by using a GPCHLC-8120GPC manufactured by Tosoh Corporation as a measurement apparatus, using a column TSKgel SuperHM-M (15 cm) manufactured by Tosoh Corporation, and using a THF solvent. The weight average molecular weight and the number average molecular weight are determined from measurement results using a molecular weight calibration curve prepared based on a monodispersed polystyrene standard sample.

The amorphous polyester resin is obtained by a common production method. Specifically, for example, the amorphous polyester resin is obtained by a method in which the polymerization temperature is set to 180° C. or higher and 230° C. or lower, the pressure inside a reaction system is reduced as necessary, and reaction is performed while removing water or alcohols generated during the condensation.

When a raw material monomer is not dissolved or compatible at the reaction temperature, a solvent having a high boiling point may be added as a dissolution aid to dissolve the monomer. In this case, a polycondensation reaction is performed while distilling off the dissolution aid. When there is a monomer with poor compatibility in a copolymerization reaction, the monomer having poor compatibility may be firstly condensed with an acid or alcohol to be polycondensed with the monomer having poor compatibility, and then the obtained product is polycondensed with a main component.

Crystalline Polyester Resin

Examples of the crystalline polyester resin include a polycondensate of a polycarboxylic acid and a polyhydric alcohol. As the crystalline polyester resin, a commercially available product may be used, or a synthetic resin may be used.

Here, in order to easily form a crystal structure, the crystalline polyester resin may be a polycondensate using a linear aliphatic polymerizable monomer rather than a polymerizable monomer having an aromatic ring.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides thereof, and lower alkyl esters thereof (for example, having 1 to 5 carbon atoms).

As for the polycarboxylic acid, a trivalent or higher carboxylic acid having a crosslinked structure or a branched structure may be used in combination with the dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower alkyl esters thereof (for example, having 1 to 5 carbon atoms).

As the polycarboxylic acid, a dicarboxylic acid having a sulfonic acid group or a dicarboxylic acid having an ethylenic double bond may be used in combination with the dicarboxylic acids.

The polycarboxylic acid may be used alone or in combination of two or more kinds thereof.

Examples of the polyhydric alcohol include aliphatic diols (such as a linear aliphatic diol having 7 to 20 carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, the aliphatic diol is preferably 1,8-octanediol, 1,9-nonanediol, and 1,10-decanediol.

As the polyhydric alcohol, a trihydric alcohol or higher alcohol having a cross-linked structure or a branched structure may be used in combination with a diol. Examples of the trihydric alcohol or higher polyhydric alcohol include glycerin, trimethylolethane, trimethylolpropane, and pentaerythritol.

The polyhydric alcohol may be used alone or in combination of two or more thereof.

Here, the polyhydric alcohol may have an aliphatic diol content of 80 mol % or more, and preferably has an aliphatic diol content of 90 mol % or more.

A melting temperature of the crystalline polyester resin may be 50° C. or higher and 100° C. or lower, and is preferably 55° C. or higher and 90° C. or lower, and still more preferably 60° C. or higher and 85° C. or lower.

The melting temperature is obtained from a differential scanning calorimetry (DSC) curve obtained by the DSC according to the "melting peak temperature" described in the method for obtaining the melting temperature in "Method for measuring transition temperature of plastics" in JIS K7121: 1987.

A weight average molecular weight (Mw) of the crystalline polyester resin may be 6,000 or more and 35,000 or less.

The crystalline polyester resin may be obtained by, for example, a common production method like the amorphous polyester resin.

A content of the binder resin may be 40 mass % or more and 95 mass % or less, and is preferably 50 mass % or more and 90 mass % or less, and more preferably 60 mass % or more and 85 mass % or less, relative to a total amount of the toner particles.

—Colorant—

Examples of the colorant include: pigments such as carbon black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more thereof.

As the colorant, a surface-treated colorant may be used as necessary, or the colorant may be used in combination with a dispersant. Plural kinds of colorants may be used in combination.

A content of the colorant may be 1 mass % or more and 30 mass % or less, and is preferably 3 mass % or more and 15 mass % or less, relative to the total amount of the toner particles.

—Releasing Agent—

Examples of the releasing agent include: hydrocarbon wax; natural wax such as carnauba wax, rice wax, and candelilla wax; synthetic wax or mineral or petroleum wax such as montan wax; and ester wax such as fatty acid ester and montanic acid ester. The releasing agent is not limited thereto.

The melting temperature of the releasing agent may be 50° C. or higher and 110° C. or lower, and is preferably 60° C. or higher and 100° C. or lower.

The melting temperature is obtained from the "melting peak temperature" described in the method for obtaining the melting temperature in "Method for measuring transition temperature of plastics" in JIS K7121: 1987, from a differential scanning calorimetry (DSC) curve obtained by the DSC.

A content of the releasing agent may be 1 mass % or more and 20 mass % or less, and is preferably 5 mass % or more and 15 mass % or less, relative to the total amount of the toner particles.

—Other Additives—

Examples of the other additives include common additives such as a magnetic material, a charge-controlling agent, and an inorganic powder. These additives are contained in the toner particles as internal additives.

—Characteristics of Toner Particles—

The toner particles may have a single layer structure, or a so-called core-shell structure composed of a core portion (core particles) and a coating layer (shell layer) that covers the core portion.

The toner particles having a core-shell structure may be composed of, for example, a core portion including a binder resin and, if necessary, other additives such as a colorant and a releasing agent, and a coating layer including a binder resin.

A volume average particle diameter (D50v) of the toner particles may be 2 μm or more and 10 μm or less, and is preferably 4 μm or more and 8 μm or less.

The volume average particle diameter (D50v) of the toner particles is measured using Coulter Multisizer II (manufactured by Beckman Coulter, Inc.) with ISOTON-II (manufactured by Beckman Coulter, Inc.) as an electrolytic solution.

In the measurement, 0.5 mg or more and 50 mg or less of a measurement sample is added to 2 ml of a 5 mass % aqueous solution of a surfactant (for example, sodium alkylbenzene sulfonate) as a dispersant. The obtained mixture is added to 100 ml or more and 150 ml or less of the electrolytic solution.

The electrolytic solution in which the sample is suspended is dispersed for 1 minute with an ultrasonic disperser, and the particle size distribution of particles having a particle diameter in a range of 2 μm or more and 60 μm or less is measured by the Coulter Multisizer II using an aperture having an aperture diameter of 100 μm. The number of the particles sampled is 50,000. A particle diameter corresponding to the cumulative percentage of 50% in a particle size distribution based on volume drawn from the small diameter side is defined as the volume average particle diameter D50v.

An average circularity of the toner particles may be 0.94 or more and 1.00 or less, and is preferably 0.95 or more and 0.98 or less.

The average circularity of the toner particles is obtained by (circle equivalent perimeter)/(perimeter) (i.e. (perimeter of a circle having the same projection area as a particle image)/(perimeter of the projected particle image)). Specifically, the average circularity is a value measured by the following method.

First, the toner particles as measurement targets are sucked and collected to form a flat flow, and flash light is emitted instantly to capture a particle image as a still image. The average circularity is determined by a flow type particle image analyzer (FPIA-3000 manufactured by Sysmex Corporation) for image analysis. The number of samples for obtaining the average circularity is 3,500.

In a case where the toner contains an external additive, the toner (developer) to be measured is dispersed in water containing a surfactant, and then an ultrasonic treatment is performed to obtain toner particles from which the external additive is removed.

—Method for Producing Toner Particles—

The toner particles may be manufactured by either a dry production method (such as a kneading and pulverization method) or a wet production method (such as an aggregation and coalescence method, a suspension and polymerization method, and a dissolution and suspension method). These production methods are not particularly limited, and common production methods are adopted. Among these, the toner particles may be obtained by the aggregation and coalescence method.

Specifically, for example, when the toner particles are produced by the aggregation and coalescence method, the toner particles are produced through a step of preparing a resin particle dispersion liquid in which resin particles to be a binder resin are dispersed (resin particle dispersion liquid preparation step), a step of aggregating the resin particles (and other particles if necessary) in the resin particle dispersion liquid (in a dispersion liquid after mixing with another particle dispersion liquid if necessary) to form aggregated particles (aggregated particle forming step), and a step of heating an aggregated particle dispersion liquid in which the aggregated particles are dispersed, and fusing and coalescing the aggregated particles to form the toner particles (fusion and coalescence step).

Hereinafter, details of each step will be described.

In the following description, a method for obtaining toner particles containing a colorant and a releasing agent will be described, but the colorant and the releasing agent are used as necessary. Of course, other additives other than the colorant and the releasing agent may be used.

—Resin Particle Dispersion Liquid Preparation Step—

In addition to the resin particle dispersion liquid in which the resin particles to be the binder resin are dispersed, for example, a colorant particle dispersion liquid in which colorant particles are dispersed and a releasing agent particle dispersion liquid in which releasing agent particles are dispersed are prepared.

The resin particle dispersion liquid is prepared by, for example, dispersing the resin particles in a dispersion medium with a surfactant.

Examples of the dispersion medium for use in the resin particle dispersion liquid include an aqueous medium.

Examples of the aqueous medium include water such as distilled water and ion exchange water, and alcohols. The aqueous medium may be used alone or in combination of two or more thereof.

Examples of the surfactant include: anionic surfactants such as a sulfate-based surfactant, a sulfonate-based surfactant, a phosphate ester-based surfactant, and a soap-based surfactant; cationic surfactants such as an amine salt-based surfactant and a quaternary ammonium salt-based surfactant; and non-ionic surfactants such as a polyethylene glycol-based surfactant, an alkylphenol ethylene oxide adduct-based surfactant, and a polyhydric alcohol-based surfactant. Among these, the anionic surfactant and the cationic surfactants are particularly exemplified. The non-ionic surfactant may be used in combination with the anionic surfactant or the cationic surfactant.

The surfactant may be used alone or in combination of two or more thereof.

For the resin particle dispersion liquid, examples of a method of dispersing the resin particles in the dispersion medium include general dispersion methods such as a rotary shear homogenizer, a ball mill having a medium, a sand mill, and a dyno mill, or the like. Depending on a kind of the resin particles, the resin particles may be dispersed in the dispersion medium by a phase inversion emulsification method. In the phase inversion emulsification method, a resin to be dispersed is dissolved in a hydrophobic organic solvent in which the resin is soluble, and a base is added to an organic continuous phase (O phase) to neutralize the resin, and then an aqueous medium (W phase) is added to perform phase inversion from W/O to O/W, and the resin is dispersed in the aqueous medium in the form of particles.

A volume average particle diameter of the resin particles dispersed in the resin particle dispersion liquid may be, for example, 0.01 μm or more and 1 μm or less, and is preferably 0.08 μm or more and 0.8 μm or less, and more preferably 0.1 μm or more and 0.6 μm or less.

The volume average particle diameter D50v of the resin particles is calculated by the volume-based particle size distribution obtained by measurement with a laser diffraction type particle size distribution measuring device (for example, LA-700 manufactured by HORIBA, Ltd.). A divided particle size range is set and the volume-based particle size distribution is obtained. Then, a cumulative distribution is drawn from a small particle diameter side and a particle diameter corresponding to the cumulative percentage of 50% with respect to all the particles is the volume average particle diameter D50v. The volume average particle diameters of the particles in other dispersion liquid is measured in the same manner.

A content of the resin particles contained in the resin particle dispersion liquid may be 5 mass % or more and 50 mass % or less, and is preferably 10 mass % or more and 40 mass % or less.

Similar to the resin particle dispersion liquid, for example, the colorant particle dispersion liquid and the releasing agent particle dispersion liquid are also prepared. That is, the volume average particle diameter, dispersion medium, dispersion method, and content of the particles in the resin particle dispersion liquid are the same for the colorant particles dispersed in the colorant particle dispersion liquid and the releasing agent particles dispersed in the releasing agent particle dispersion liquid.

—Aggregated Particle Forming Step—

Next, the resin particle dispersion liquid, the colorant particle dispersion liquid, and the releasing agent particle dispersion liquid are mixed.

Then, in the mixed dispersion liquid, the resin particles, the colorant particles, and the releasing agent particles are hetero-aggregated to form aggregated particles containing the resin particles, the colorant particles, and the releasing agent particles, each having a diameter close to the diameter of the target toner particles.

Specifically, for example, the aggregated particles are formed by adding an aggregating agent to the mixed dispersion liquid, adjusting the pH of the mixed dispersion liquid to acidic (for example, a pH of 2 or more and 5 or less), adding a dispersion stabilizer as necessary, then heating the mixed dispersion liquid to a temperature close to the glass transition temperature of the resin particles (specifically, for example, the temperature being equal to or higher than the glass transition temperature of the resin particles minus 30° C. and the temperature being equal to or lower than the glass transition temperature minus 10° C.), and aggregating the particles dispersed in the mixed dispersion liquid.

In the aggregated particle forming step, for example, the aggregating agent may be added at room temperature (for example, 25° C.) while stirring the mixed dispersion liquid with a rotary shearing homogenizer, the pH of the mixed dispersion liquid may be adjusted to be acidic (for example, a pH of 2 or more and 5 or less), the dispersion stabilizer may be added as necessary, and then heating may be performed.

Examples of the aggregating agent include a surfactant having a polarity opposite to that of the surfactant contained in the mixed dispersion liquid, an inorganic metal salt, and a divalent or higher metal complex. In the case where the metal complex is used as the aggregating agent, an amount of the surfactant used is reduced and chargeability is improved.

If necessary, an additive that forms a complex or a similar bond with metal ions of the aggregating agent may be used together with the aggregating agent. The additive may be a chelating agent.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid, and aminocarboxylic acids such as iminodiacetic acid (IDA), nitrilotriacetic acid (NTA), and ethylenediaminetetraacetic acid (EDTA).

An addition amount of the chelating agent may be 0.01 parts by mass or more and 5.0 parts by mass or less, and is preferably 0.1 parts by mass or more and less than 3.0 parts by mass, relative to 100 parts by mass of the resin particles.

—Fusion and Coalesce Step—

Next, the aggregated particle dispersion liquid in which the aggregated particles are dispersed is heated to, for example, a temperature equal to or higher than the glass transition temperature of the resin particles (for example, a temperature being higher than the glass transition temperature of the resin particles by 10° C. to 30° C.), so that the aggregated particles are fused and coalesced to form the toner particles.

The toner particles are obtained through the above steps.

The toner particles may be produced through a step of obtaining an aggregated particle dispersion liquid in which the aggregated particles are dispersed, then further mixing the aggregated particle dispersion liquid and the resin particle dispersion liquid in which the resin particles are dispersed, and performing aggregation so as to further adhere the resin particles to surfaces of the aggregated particles to form second aggregated particles, and a step of heating a second aggregated particle dispersion liquid in which the second aggregated particles are dispersed to fuse and coalesce the second aggregated particles, thereby forming the toner particles having a core-shell structure.

After the fusion and coalescence step is completed, the toner particles formed in the solution are subjected to a common washing step, a solid-liquid separation step, and a drying step to obtain dried toner particles. In the washing step, from the viewpoint of chargeability, replacement washing with ion exchange water may be sufficiently performed. In the solid-liquid separation step, from the viewpoint of productivity, suction filtration, pressure filtration, or the like may be performed. In the drying step, from the viewpoint of productivity, freeze-drying, air-flow drying, fluid-drying, vibration-type fluid-drying, or the like may be performed.

Then, the toner according to the exemplary embodiment is produced, for example, by adding an external additive to the obtained dried toner particles and mixing them. The mixing may be performed by, for example, a V blender, a Henschel mixer, a Loedige mixer, or the like. Further, if necessary, coarse particles in the toner may be removed by using a vibration sieving machine, a wind power sieving machine, or the like.

—External Additive—

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaOSiO_2$, $K_2O\cdot(TiO_2)_n$, $Al_2O_3\cdot 2SiO_2$, $CaCO_3$, $MgCO_3$, $BaSO_4$, and $MgSO_4$.

The surface of the inorganic particles as the external additive may be subjected to a hydrophobic treatment. The hydrophobic treatment is performed by, for example, immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more kinds thereof.

An amount of the hydrophobic treatment agent may be generally, for example, 1 part by mass or more and 10 parts by mass or less relative to 100 parts by mass of the inorganic particles.

Examples of the external additive also include resin particles (particles of resins such as polystyrene, polymethylmethacrylate, and melamine resin), and cleaning activators (for example, metal salts of higher fatty acids represented by zinc stearate, and particles of a fluoropolymer).

An amount of the external additive externally added may be, for example, 0.01 mass % or more and 5.0 mass % or less, and is preferably 0.01 mass % or more and 2.0 mass % or less, relative to the toner particles.

<Image Forming Apparatus and Image Forming Method>

An image forming apparatus according to the exemplary embodiment includes: an image carrier; a charging unit that charges a surface of the image carrier; an electrostatic charge image forming unit that forms an electrostatic charge image on the charged surface of the image carrier; a developing unit that accommodates an electrostatic charge image developer and develops, by the electrostatic charge image developer, the electrostatic charge image formed on the surface of the image carrier as a toner imager; a transfer unit that transfers the toner image formed on the surface of the image carrier to a surface of a recording medium; and a fixing unit that fixes the toner image transferred to the surface of the recording medium. As the electrostatic charge image developer, the electrostatic charge image developer according to the exemplary embodiment is used.

In the image forming apparatus according to the exemplary embodiment, an image forming method (an image forming method according to the exemplary embodiment) is performed, the image forming method including: a charging step of charging the surface of the image carrier; an electrostatic charge image forming step of forming an electrostatic charge image on the charged surface of the image carrier; a developing step of developing, by the electrostatic charge image developer according to the exemplary embodiment, the electrostatic charge image formed on the surface of the image carrier as a toner image; a transfer step of transferring the toner image formed on the surface of the image carrier to a surface of a recording medium; and a fixing step of fixing the toner image transferred to the surface of the recording medium.

A common image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer body, and secondarily transfers the toner image transferred to the surface of the intermediate transfer body to the surface of the recording medium, an apparatus including a cleaning unit that cleans the surface of the image carrier after the transfer of the toner image and before charging, and an apparatus including an erasing unit that erases the surface of the image carrier by irradiation with erasing light after the transfer of the toner image and before the charging, may be used as the image forming apparatus according to the exemplary embodiment.

In the case where the image forming apparatus according to the exemplary embodiment is an intermediate transfer type apparatus, the transfer unit includes, for example, an intermediate transfer body having a surface on which a toner image is transferred, a primary transfer unit that primarily transfers the toner image formed on the surface of the image carrier to the surface of the intermediate transfer body, and a secondary transfer unit that secondarily transfers the toner image transferred to the surface of the intermediate transfer body to the surface of the recording medium.

In the image forming apparatus according to the exemplary embodiment, for example, a part including the developing unit may have a cartridge structure (process cartridge)

detachable from the image forming apparatus. As the process cartridge, for example, a process cartridge that accommodates the electrostatic charge image developer according to the exemplary embodiment and includes a developing unit may be used.

Hereinafter, an example of the image forming apparatus according to the exemplary embodiment will be described, whereas the image forming apparatus is not limited thereto. In the following description, the parts illustrated in the drawings will be described, and description of other parts will be omitted.

FIG. 1 is a schematic configuration diagram illustrating the image forming apparatus according to the exemplary embodiment.

The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. These image forming units (hereinafter may be simply referred to as "unit") 10Y, 10M, 10C, and 10K are arranged side by side at a preset distance from each other in a horizontal direction. These units 10Y, 10M, 10C, and 10K may be process cartridges detachable from the image forming apparatus.

Above the units 10Y, 10M, 10C, and 10K, an intermediate transfer belt (an example of the intermediate transfer body) 20 extends through respective units. The intermediate transfer belt 20 is provided by being wound around a drive roll 22 and a support roll 24, and travels in a direction from the first unit 10Y to the fourth unit 10K. A force is applied to the support roll 24 in a direction away from the drive roll 22 by a spring or the like (not shown), and tension is applied to the intermediate transfer belt 20 wound around the drive roll 22 and the support roll 24. An intermediate transfer body cleaning device 30 is provided on a side surface of an image carrier of the intermediate transfer belt 20 so as to face the drive roll 22.

Yellow, magenta, cyan, and black toners contained in toner cartridges 8Y, 8M, 8C, and 8K are supplied to developing devices 4Y, 4M, 4C, and 4K (an example of the developing unit) of the units 10Y, 10M, 10C, and 10K, respectively.

Since the first to fourth units 10Y, 10M, 10C, and 10K have the same configuration and operation, here, the first unit 10Y that is arranged on an upstream side in a travelling direction of the intermediate transfer belt and forms a yellow image, will be described as a representative. 1M, 1C, and 1K in the second to fourth units 10M, 10C, and 10K are photoconductors corresponding to the photoconductor 1Y in the first unit 10Y; 2M, 2C and 2K are charging rolls corresponding to the charging roll 2Y; 3M, 3C, and 3K are laser beams corresponding to the laser beam 3Y; and 6M, 6C, and 6K are photoconductor cleaning devices corresponding to the photoconductor cleaning device 6Y.

The first unit 10Y includes the photoconductor 1Y (an example of the image carrier) that acts as an image carrier. Around the photoconductor 1Y, the following members are arranged in the following order: the charging roll (an example of the charging unit) 2Y that charges a surface of the photoconductor 1Y to a preset potential; an exposure device (an example of the electrostatic charge image forming unit) 3 that exposes the charged surface with the laser beam 3Y based on a color-separated image signal to form an electrostatic charge image; the developing device (an example of the developing unit) 4Y that supplies a charged toner to the electrostatic charge image to develop the electrostatic charge image; a primary transfer roll 5Y (an example of the primary transfer unit) that transfers the developed toner image onto the intermediate transfer belt 20; and the photoconductor cleaning device (an example of the cleaning unit) 6Y that removes the toner remaining on the surface of the photoconductor 1Y after the primary transfer.

The primary transfer roll 5Y is arranged on an inner side of the intermediate transfer belt 20 and is provided at a position facing the photoconductor 1Y. A bias power supply (not shown) that applies a primary transfer bias is connected to each of the primary transfer rolls 5Y, 5M, 5C, and 5K of respective units. Each bias power supply changes a value of the transfer bias applied to each primary transfer roll under the control of a controller (not shown).

Hereinafter, an operation of forming a yellow image in the first unit 10Y will be described.

First, prior to the operation, the surface of the photoconductor 1Y is charged to a potential of −600 V to −800 V by using the charging roll 2Y.

The photoconductor 1Y is formed by laminating a photoconductive layer on a conductive substrate (for example, having a volume resistivity of $1\times10^{-6}$ Ω·cm or less at 20° C.). The photoconductive layer usually has high resistance (resistance of general resin), but has characteristics that when irradiated with a laser beam, the specific resistance of the portion irradiated with the laser beam changes. Therefore, the charged surface of the photoconductor 1Y is irradiated with the laser beam 3Y from the exposure device 3 in accordance with yellow image data sent from the controller (not shown). Accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to allow charges on the surface of the photoconductor 1Y to flow and by, on the other hand, leaving charges of a portion not irradiated with the laser beam 3Y.

The electrostatic charge image formed on the photoconductor 1Y rotates to a preset developing position by travelling of the photoconductor 1Y. Then, at this developing position, the electrostatic charge image on the photoconductor 1Y is developed and visualized as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charges on the photoconductor 1Y and is carried on a developer roll (an example of a developer carrier). Then, when the surface of the photoconductor 1Y passes through the developing device 4Y, the yellow toner electrostatically adheres to an erased latent image portion on the surface of the photoconductor 1Y, and the latent image is developed by the yellow toner. The photoconductor 1Y on which the yellow toner image is formed continuously travels at a preset speed, and the toner image developed on the photoconductor 1Y is conveyed to a preset primary transfer position.

When the yellow toner image on the photoconductor 1Y is conveyed to the primary transfer position, a primary transfer bias is applied to the primary transfer roll 5Y, an electrostatic force from the photoconductor 1Y to the primary transfer roll 5Y acts on the toner image, and the toner image on the photoconductor 1Y is transferred to the intermediate transfer belt 20. The transfer bias applied at this time has a polarity (+) opposite to the polarity (−) of the toner, and is controlled to, for example, +10 μA by the controller (not shown) in the first unit 10Y.

On the other hand, the toner remaining on the photoconductor 1Y is removed and collected by the photoconductor cleaning device 6Y.

The primary transfer bias applied to each of the primary transfer rolls 5M, 5C, and 5K of the second unit 10M and the subsequent units is also controlled in the same manner as in the first unit.

In this way, the intermediate transfer belt 20 to which the yellow toner image is transferred by the first unit 10Y is sequentially conveyed through the second to fourth units 10M, 10C, and 10K, and toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roll 24 in contact with an inner surface of the intermediate transfer belt, and a secondary transfer roll (an example of a secondary transfer unit) 26 arranged on an image carrying surface side of the intermediate transfer belt 20. On the other hand, a recording sheet (an example of the recording medium) P is fed through a supply mechanism to a gap where the secondary transfer roll 26 and the intermediate transfer belt 20 are in contact with each other at a preset timing, and a secondary transfer bias is applied to the support roll 24. The transfer bias applied at this time has the same polarity (−) as the polarity (−) of the toner. An electrostatic force from the intermediate transfer belt 20 to the recording sheet P acts on the toner image, and the toner image on the intermediate transfer belt 20 is transferred to the recording sheet P. The secondary transfer bias at this time is determined based on the resistance detected by a resistance detecting unit (not shown) that detects the resistance of the secondary transfer unit, and is controlled by voltage.

Thereafter, the recording sheet P is sent to a pressure-contacting portion (nip portion) of a pair of fixing rolls in a fixing device 28 (an example of the fixing unit), and the toner image is fixed onto the recording sheet P, thereby forming a fixed image.

Examples of the recording sheet P onto which the toner image is transferred include plain paper used in electrophotographic copiers, printers or the like. As the recording medium, in addition to the recording sheet P, an OHP sheet or the like may be used.

In order to further improve the smoothness of an image surface after fixing, the surface of the recording sheet P may also be smooth. For example, coating paper obtained by coating the surface of the plain paper with a resin or the like, art paper for printing, or the like may be used.

The recording sheet P on which the fixing of the color image is completed is discharged toward a discharge unit, and a series of color image forming operations is completed.

<Process Cartridge>

The process cartridge according to the exemplary embodiment includes a developing unit that accommodates the electrostatic charge image developer according to the exemplary embodiment and develops, by the electrostatic charge image developer, the electrostatic charge image formed on the surface of the image carrier as the toner image, and is detachable from the image forming apparatus.

The process cartridge according to the exemplary embodiment is not limited to the above configuration and may be configured to include a developing unit and, if necessary, at least one selected from other units such as an image carrier, a charging unit, an electrostatic charge image forming unit, and a transfer unit.

Hereinafter, an example of the process cartridge according to the exemplary embodiment will be illustrated, whereas the process cartridge is not limited thereto. In the following description, the parts illustrated in the drawings will be described, and description of other parts will be omitted.

Figure 2:
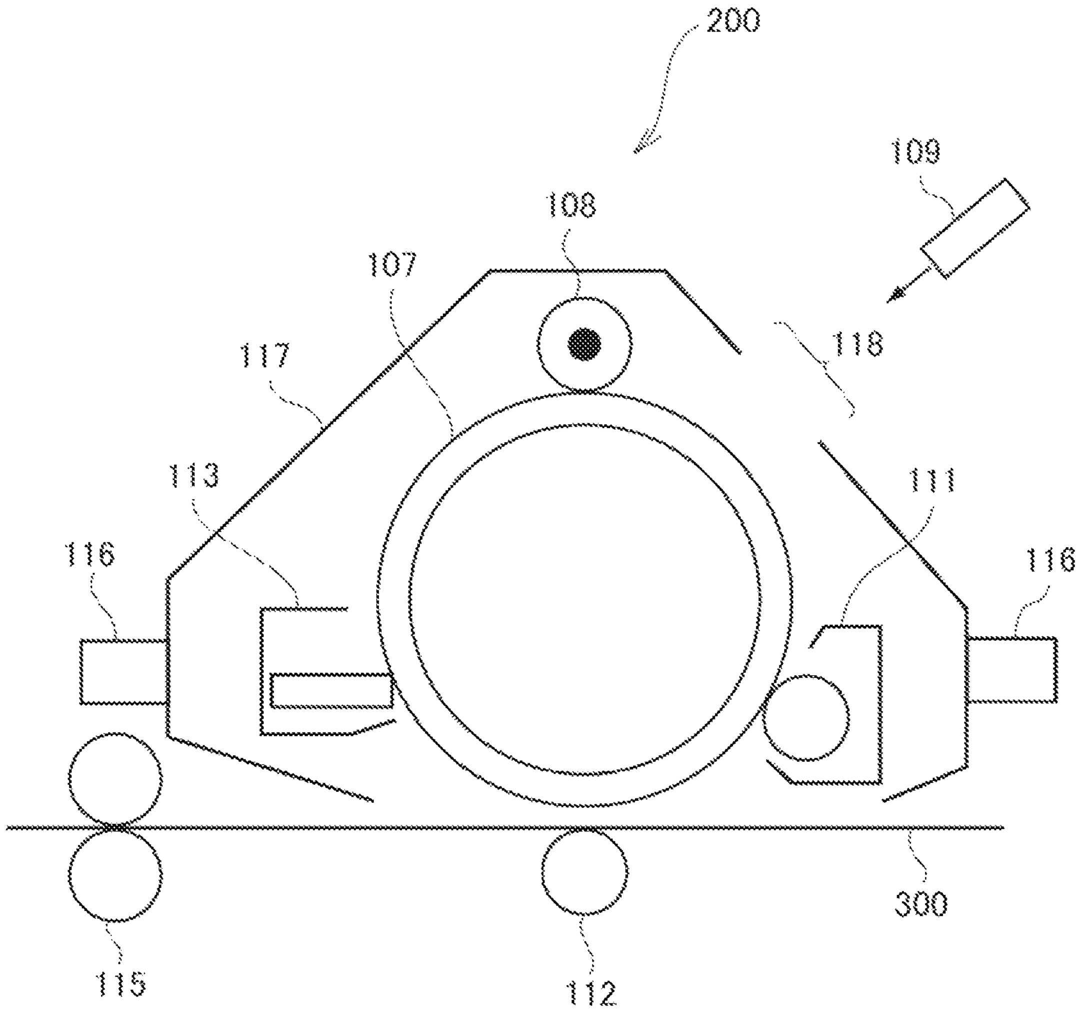
FIG. 2 is a schematic configuration diagram illustrating an example of a process cartridge detachable from the image forming apparatus according to the exemplary embodiment.

FIG. 2 is a schematic configuration diagram illustrating the process cartridge according to the exemplary embodiment.

A process cartridge 200 illustrated in FIG. 2 is formed as a cartridge by, for example, integrally combining and holding a photoconductor 107 (an example of the image carrier), a charging roll 108 (an example of the charging unit), an image developing device 111 (an example of the developing unit), and a photoconductor cleaning device 113 (an example of a cleaning unit), each provided around the photoconductor 107 by a housing 117 having a mounting rail 116 and an opening 118 for exposure.

In FIG. 2, the reference numeral 109 denotes an exposure device (an example of the electrostatic charge image forming unit), the reference numeral 112 denotes a transfer device (an example of the transfer unit), the reference numeral 115 denotes a fixing device (an example of the fixing unit), and the reference numeral 300 denotes recording sheet (an example of the recording medium).

EXAMPLES

Hereinafter, the exemplary embodiment of the invention will be described in detail with reference to Examples, but the exemplary embodiment of the invention is not limited to these Examples. In the following description, all "parts" and "%" are based on mass unless otherwise specified.

Example 1

<<Preparation of Ferrite Particles>>

1318 parts of $Fe_2O_3$, 587 parts of $Mn(OH)_2$, and 96 parts of $Mg(OH)_2$ are mixed and calcined at a temperature of 900° C. for 4 hours. The calcined product, 6.6 parts of polyvinyl alcohol, 0.5 parts of polycarboxylic acid as a dispersant, and zirconia beads having a media diameter of 1 mm are added to water, followed by pulverizing and mixing in a sand mill to obtain a dispersion liquid. A volume average particle diameter of particles in the dispersion liquid is 1.5 μm.

The dispersion liquid is used as a raw material and granulated and dried with a spray dryer to obtain granules having a volume average particle diameter of 37 μm. Next, under an oxygen-nitrogen mixed atmosphere having an oxygen partial pressure of 1%, firing is performed using an electric furnace at a temperature of 1450° C. for 4 hours, and then heating is performed in air at a temperature of 900° C. for 3 hours to obtain fired particles. The fired particles are crushed and classified to obtain ferrite particles (1) having a volume average particle diameter of 35 μm. An arithmetic average height Ra (JIS B0601: 2001) of a roughness curve of the ferrite particles (1) is 0.6 μm.

<<Coating Agent (1)>>

Resin (1) Perfluoropropylethyl methacrylate/methyl methacrylate copolymer (polymerization ratio by mass=30:70, weight average molecular weight Mw=19000): 12.1 parts Resin (2) Cyclohexyl methacrylate resin (weight average molecular weight: 350,000): 8.1 parts Carbon black (VXC72 manufactured by Cabot Corporation): 0.8 parts Inorganic particles (1): 9 parts (Commercially available hydrophilic silica particles (fumed silica particles, without surface treatment, volume average particle diameter: 40 nm))

Toluene: 250 parts

Isopropyl alcohol: 50 parts

The above materials and glass beads (diameter: 1 mm, the same amount as toluene) are added to a sand mill and stirred at a rotation speed of 190 rpm for 30 minutes, to obtain a coating agent (1).

<<Preparation of Carrier (1)>>

1,000 parts of the ferrite particles (1) and half of the coating agent (1) are charged into a kneader and mixed at room temperature (25° C.) for 20 minutes. Then, the mixture is heated to 70° C., under reduced pressure and dried.

A dried product is cooled to room temperature (25° C.), the other half of the coating agent (1) is additionally added, and the mixture is mixed at room temperature (25° C.) for 20 minutes. Then, the mixture is heated to 70° C., under reduced pressure and dried for 20 minutes.

Next, a dried product is taken out from the kneader, and coarse powder is sieved with a mesh having a mesh size of 75 μm to obtain a carrier (1).

Examples 2 to 31

As shown in Table 1, carriers (2) to (31) are obtained in the same manner as in Example 1, except that the kind of coating resin, the amount of coating agent, the kind of inorganic particles, the amount of inorganic particles added, the mixing time, and the drying time under reduced pressure are changed.

Comparative Examples 1 to 2

As shown in Table 1, carriers (C1) to (C2) are obtained in the same manner as in Example 1, except that the amount of coating agent, the kind of inorganic particles, the amount of inorganic particles added, and the drying time under reduced pressure are changed.

<Various Characteristics of Carrier>

The following characteristics of the carrier in each example are measured according to the methods described above.

Ratio of Si (denoted as "Si Ratio" in the table) on the surface of the coating resin layer Area ratio of the silica particle exposed on the surface of the coating resin layer (denoted as "Area Ratio of Silica Particle" in the table)

Average length RSm of roughness curve element of the carrier surface (denoted as "RSm" in the table)

Arithmetic average height Ra of the roughness curve of the carrier (denoted as "Ra" in the table)

<Evaluation of Toner Charge Maintainability>

A developer prepared by mixing the carrier and the toner at a mass ratio of 100:8 in each example is added to a developing device at a C color position in the image forming apparatus ("Iridesse Production Press" manufactured by Fuji Xerox Co., Ltd.).

50,000 sheets of printing are performed by the image forming apparatus, about 20 g of the developer at the initial stage and after printing of 50,000 sheets is sampled, and blow-off is performed to remove the toner from the developer, and only a carrier is isolated. Relative to 10 g of the carrier, 0.8 g of the toner used for preparing the developer is newly added to the obtained carrier, and the mixture is stirred with a Turbula mixer for 5 minutes, and the charge amount is measured.

A ratio of the carrier charge amount of an initial developer to the carrier charge amount of the developer after printing of 50,000 sheets (ratio of charge after printing of 50,000 sheets to charge at the initial state) is measured, and the toner charge maintainability is evaluated according to the following criteria.

A: The ratio of the carrier charge amount is 0.9 or more.

B: The ratio of the carrier charge amount is 0.85 or more and less than 0.9.

C: The ratio of the carrier charge amount is 0.8 or more and less than 0.85.

D: The ratio of the carrier charge amount is 0.7 or more and less than 0.8.

E: The ratio of the carrier charge amount is less than 0.7.

TABLE 1

| | Coating Agent | | | | | | | | |
|---|---|---|---|---|---|---|---|---|---|
| | Resin | | Inorganic Particle | | | | | Mixing Time After Additionally Addition [min] | Drying Time under Reduced Pressure [min] |
| | Kind | Mw × 10,000 | Kind | Amount Added (part) | Average Particle Diameter D [nm] | PFEM/MM (part) | CHM (part) | | |
| Example 1 | PFEM/MM, CHM | 15 | 1 | 9 | 40 | 12.1 | 8.1 | 20 | 20 |
| Example 2 | PFEM/MM, CHM | 15 | 1 | 5.6 | 40 | 13.0 | 8.6 | 20 | 25 |
| Example 3 | PFEM/MM, CHM | 15 | 1 | 14.4 | 40 | 10.1 | 6.7 | 20 | 15 |
| Example 4 | PFEM/MM, CHM | 15 | 2 | 13.5 | 4 | 18.4 | 12.3 | 20 | 20 |
| Example 5 | PFEM/MM, CHM | 15 | 3 | 12.6 | 7 | 17.2 | 11.4 | 20 | 20 |
| Example 6 | PFEM/MM, CHM | 15 | 6 | 5.1 | 88 | 6.7 | 4.4 | 20 | 20 |
| Example 7 | PFEM/MM, CHM | 15 | 7 | 4.5 | 93 | 5.8 | 3.9 | 20 | 20 |
| Example 8 | PFEM/MM, CHM | 15 | 1 | 4.5 | 40 | 5.8 | 3.9 | 20 | 20 |
| Example 9 | PFEM/MM, CHM | 15 | 1 | 5.1 | 40 | 6.7 | 4.4 | 20 | 20 |
| Example 10 | PFEM/MM, CHM | 15 | 1 | 12.6 | 40 | 17.2 | 11.4 | 20 | 20 |
| Example 11 | PFEM/MM, CHM | 15 | 1 | 13.5 | 40 | 18.4 | 12.3 | 20 | 20 |
| Example 12 | PFEM/MM, CHM | 15 | 2 | 9 | 4 | 12.1 | 8.1 | 20 | 20 |
| Example 13 | PFEM/MM, CHM | 15 | 3 | 9 | 7 | 12.1 | 8.1 | 20 | 20 |
| Example 14 | PFEM/MM, CHM | 15 | 6 | 9 | 88 | 12.1 | 8.1 | 20 | 20 |
| Example 15 | PFEM/MM, CHM | 15 | 7 | 9 | 93 | 12.1 | 8.1 | 20 | 20 |
| Example 16 | PFEM/MM, CHM | 15 | 4 | 5.04 | 12 | 13.3 | 8.9 | 20 | 8 |

TABLE 1-continued

| | | | | | | | | | |
|---|---|---|---|---|---|---|---|---|---|
| Example 17 | PFEM/MM, CHM | 15 | 4 | 5.6 | 12 | 13.0 | 8.6 | 20 | 11 |
| Example 18 | PFEM/MM, CHM | 15 | 5 | 16.5 | 62 | 9.4 | 6.3 | 20 | 24 |
| Example 19 | PFEM/MM, CHM | 15 | 5 | 17.16 | 62 | 9.0 | 6.0 | 20 | 28 |
| Example 20 | PFEM/MM, CHM | 28 | 1 | 9 | 40 | 4.0 | 16.2 | 20 | 20 |
| Example 21 | CHM | 35 | 1 | 9 | 40 | 0.0 | 20.2 | 20 | 20 |
| Example 22 | PFEM/MM, CHM | 25 | 1 | 9 | 40 | 6.1 | 14.1 | 20 | 20 |
| Example 24 | PFEM/MM, CHM | 15 | 5 | 17.16 | 62 | 9.0 | 6.0 | 25 | 28 |
| Example 25 | PFEM/MM, CHM | 15 | 5 | 16.5 | 62 | 9.4 | 6.3 | 25 | 24 |
| Example 26 | PFEM/MM, CHM | 15 | 4 | 5.6 | 12 | 13.0 | 8.6 | 12 | 11 |
| Example 27 | PFEM/MM, CHM | 15 | 4 | 5.04 | 12 | 13.3 | 8.9 | 12 | 8 |
| Example 28 | PFEM/MM, CHM | 15 | 3 | 9 | 7 | 12.1 | 8.1 | 20 | 35 |
| Example 29 | PFEM/MM, CHM | 15 | 3 | 9 | 7 | 12.1 | 8.1 | 20 | 30 |
| Example 30 | PFEM/MM, CHM | 15 | 6 | 9 | 88 | 12.1 | 8.1 | 20 | 8 |
| Example 31 | PFEM/MM, CHM | 15 | 6 | 9 | 88 | 12.1 | 8.1 | 20 | 5 |
| Comparative Example 1 | PFEM/MM, CHM | 15 | 1 | 5.6 | 40 | 13.0 | 8.6 | 20 | 28 |
| Comparative Example 2 | PFEM/MM, CHM | 15 | 1 | 14.4 | 40 | 10.1 | 6.7 | 20 | 12 |

| | Coating Resin Layer | | | | | Carrier | | Toner Charge |
|---|---|---|---|---|---|---|---|---|
| | Content of Inorganic Particle [mass %] | Average Thickness T [μm] | D/T | Si Ratio [atom %] | Area Ratio of Silica Particle [%] | RSm [μm] | Ra [μm] | Maintainability Evaluation |
| Example 1 | 30 | 1 | 0.04 | 9.1 | 25 | 0.62 | 0.51 | A |
| Example 2 | 20 | 1 | 0.04 | 6.1 | 11 | 0.15 | 0.18 | D |
| Example 3 | 50 | 1 | 0.04 | 11.9 | 48 | 1.08 | 0.91 | D |
| Example 4 | 30 | 1.5 | 0.003 | 9.4 | 23 | 0.4 | 0.41 | C |
| Example 5 | 30 | 1.4 | 0.005 | 9 | 24 | 0.46 | 0.46 | B |
| Example 6 | 30 | 0.6 | 0.147 | 8.6 | 26 | 0.8 | 0.82 | C |
| Example 7 | 30 | 0.5 | 0.186 | 8.2 | 27 | 0.84 | 0.9 | D |
| Example 8 | 30 | 0.5 | 0.08 | 8.5 | 26 | 0.6 | 0.35 | C |
| Example 9 | 30 | 0.6 | 0.067 | 8.8 | 27 | 0.62 | 0.4 | B |
| Example 10 | 30 | 1.4 | 0.029 | 9.4 | 24 | 0.64 | 0.7 | B |
| Example 11 | 30 | 1.5 | 0.027 | 9.8 | 25 | 0.66 | 0.72 | C |
| Example 12 | 30 | 1 | 0.004 | 9.2 | 22 | 0.42 | 0.43 | C |
| Example 13 | 30 | 1 | 0.007 | 8.8 | 25 | 0.48 | 0.47 | B |
| Example 14 | 30 | 1 | 0.088 | 8.8 | 26 | 0.78 | 0.81 | C |
| Example 15 | 30 | 1 | 0.093 | 8.4 | 28 | 0.85 | 0.89 | D |
| Example 16 | 18 | 1 | 0.012 | 6.1 | 11 | 1.1 | 0.14 | D |
| Example 17 | 20 | 1 | 0.012 | 6.3 | 13 | 1.01 | 0.22 | C |
| Example 18 | 50 | 1 | 0.062 | 11 | 45 | 0.22 | 0.88 | C |
| Example 19 | 52 | 1 | 0.062 | 11.9 | 47 | 0.18 | 0.92 | D |
| Example 20 | 30 | 1 | 0.04 | 9.8 | 25 | 0.64 | 0.62 | B |
| Example 21 | 30 | 1 | 0.04 | 9.9 | 25 | 0.63 | 0.64 | C |
| Example 22 | 30 | 1 | 0.04 | 9.6 | 25 | 0.64 | 0.65 | B |
| Example 24 | 52 | 1 | 0.062 | 11.8 | 47 | 0.09 | 0.93 | D |
| Example 25 | 50 | 1 | 0.062 | 11.1 | 45 | 0.11 | 0.89 | C |
| Example 26 | 20 | 1 | 0.012 | 6.4 | 13 | 1.18 | 0.2 | C |
| Example 27 | 18 | 1 | 0.012 | 6.2 | 11 | 1.22 | 0.14 | D |
| Example 28 | 30 | 1 | 0.007 | 8.8 | 25 | 0.48 | 0.09 | D |
| Example 29 | 30 | 1 | 0.007 | 8.8 | 25 | 0.48 | 0.11 | C |
| Example 30 | 30 | 1 | 0.088 | 8.8 | 26 | 0.78 | 0.99 | C |
| Example 31 | 30 | 1 | 0.088 | 8.8 | 26 | 0.78 | 1.02 | D |
| Comparative Example 1 | 20 | 1 | 0.04 | 5.8 | 9 | 0.16 | 0.14 | E |
| Comparative Example 2 | 50 | 1 | 0.04 | 12.6 | 52 | 1.08 | 0.91 | E |

From the above results, it is found that the toner charge maintainability is excellent in Examples as compared with Comparative Examples.

Abbreviations in the Table are as Follows.

PFEM/MM: Copolymer of perfluoropropylethyl methacrylate and methyl methacrylate (polymerization ratio by mass being 30:70, weight average molecular weight Mw=19000)

CHM: Cyclohexyl methacrylate resin (weight average molecular weight: 50,000)

Mw: weight average molecular weight of single resin or mixed resin

<Preparation of Toner>

The toner used in evaluation of the toner charge maintainability is a toner prepared as follows.

<<Preparation of Amorphous Polyester Resin Dispersion Liquid (A1)>>

Ethylene glycol: 37 parts
Neopentyl glycol: 65 parts
1,9-nonanediol: 32 parts
Terephthalic acid: 96 parts The above materials are added to a flask and the temperature is raised to 200° C. over 1 hour, and after confirming that the inside of the reaction system is uniformly stirred, 1.2 parts of dibutyltin oxide is added. The temperature is raised to 240° C. over 6 hours while removing generated water by distillation, and stirring is continued at 240° C. for 4 hours to obtain an amorphous polyester resin (acid value: 9.4 mgKOH/g, weight average molecular weight: 13,000, and glass transition temperature: 62° C.). The amorphous polyester resin is transferred to an emulsification disperser (CAVITRON CD1010 manufactured by Eurotech Ltd.) at a rate of 100 g per minute while the amorphous polyester resin is in a molten state. Separately, diluted ammonia water having a concentration of 0.37% obtained by diluting reagent ammonia water with ion exchange water is put into a tank and transferred to the emulsification disperser together with the amorphous polyester resin at a rate of 0.1 liter per minute while being heated to 120° C. in a heat exchanger. The emulsification disperser is operated under the conditions of a rotor rotation speed of 60 Hz and a pressure of 5 kg/cm$^2$ to obtain an amorphous polyester resin dispersion liquid (A1) having a volume average particle diameter of 160 nm and a solid content of 20%.

<<Preparation of Crystalline Polyester Resin Dispersion Liquid (C1)>>

Decanedioic acid: 81 parts

Hexanediol: 47 parts

The above materials are added to a flask and the temperature is raised to 160° C. over 1 hour, and after confirming that the inside of the reaction system is uniformly stirred, 0.03 parts of dibutyltin oxide is added. The temperature is raised to 200° C. over 6 hours while removing generated water by distillation, and stirring is continued at 200° C. for 4 hours. Next, the reaction liquid is cooled to perform solid-liquid separation, and a solid is dried under a reduced pressure at a temperature of 40° C. to obtain a crystalline polyester resin (C1) (melting point: 64° C., and weight average molecular weight: 15,000).

Crystalline polyester resin (C1): 50 parts

Anionic surfactant (NEOGEN RK manufactured by Daiichi Kogyo Seiyaku Co., Ltd.): 2 parts Ion exchange water: 200 parts The above materials are heated to 120° C., sufficiently dispersed by a homogenizer (ULTRA-TURRAX T50 manufactured by IKA Werke), and then subjected to a dispersion treatment with a pressure discharge type homogenizer. When the volume average particle diameter reaches 180 nm, the mixture is recovered to obtain a crystalline polyester resin dispersion liquid (C1) having a solid content of 20%.

<<Preparation of Releasing Agent Particle Dispersion Liquid (W1)>>

Paraffin wax (HNP-9 manufactured by Nippon Seiro Co., Ltd.): 100 parts

Anionic surfactant (NEOGEN RK manufactured by Daiichi Kogyo Seiyaku Co., Ltd.): 1 part Ion exchange water: 350 parts The above materials are mixed and heated to 100° C., dispersed using the homogenizer (ULTRA-TURRAX T50 manufactured by IKA Werke), and then subjected to a dispersion treatment with a pressure discharge type Gaulin homogenizer to obtain a releasing agent particle dispersion liquid in which releasing agent particles having a volume average particle diameter of 200 nm are dispersed. Ion exchange water is added to the releasing agent particle dispersion liquid to prepare a releasing agent particle dispersion liquid (W1) having a solid content of 20%.

<<Preparation of Colorant Particle Dispersion Liquid (C1)>>

Cyan pigment (Pigment Blue 15:3, manufactured by Dainichiseika Color & Chemicals Mfg. Co., Ltd.): 50 parts Anionic surfactant (NEOGEN RK manufactured by Daiichi Kogyo Seiyaku Co., Ltd.): 5 parts Ion exchange water: 195 parts The above materials are mixed and subjected to a dispersion treatment for 60 minutes using a high-pressure impact type disperser (ULTIMAIZER HJP30006 manufactured by Sugino Machine Limited) to obtain a colorant particle dispersion liquid (C1) having a solid content of 20%.

<Preparation of Silica Particle Internally Added to Coating Resin Layer of Carrier>

The inorganic particles internally added to the coating resin layer of the carrier are as follows.

<<Silica Particle (1)>>

Commercially available hydrophilic silica particles (fumed silica particles, without surface treatment, volume average particle diameter: 40 nm) are prepared as the silica particle (1).

<<Silica Particle (2)>>

890 parts of methanol and 210 parts of 9.8% ammonia water are added to a 1.5 L glass reaction vessel equipped with a stirrer, a dropping nozzle, and a thermometer and mixed to obtain an alkaline catalyst solution. After the alkaline catalyst solution is adjusted to 45° C., 550 parts of tetramethoxysilane and 140 parts of 7.6% ammonia water are simultaneously added dropwise over 450 minutes while stirring to obtain a silica particle dispersion liquid (A). The silica particles in the silica particle dispersion liquid (A) have a volume average particle diameter of 4 nm and a volume particle size distribution index (square root (D84v/D16v)$^{1/2}$ of a ratio of a particle diameter D84v at 84% accumulation to a particle diameter D16v at 16% accumulation from the small diameter side in the particle size distribution by volume) being 1.2.

300 parts of the silica particle dispersion liquid (A) is added to an autoclave equipped with a stirrer, and the stirrer is rotated at a rotation speed of 100 rpm. While the stirrer is continuously rotated, liquefied carbon dioxide is injected into the autoclave from a carbon dioxide cylinder via a pump, a pressure inside the autoclave is raised by the pump while the temperature is raised by a heater, and the inside of the autoclave is changed to a supercritical state of 150° C. and 15 MPa. A pressure valve is operated to circulate supercritical carbon dioxide while keeping the inside of the autoclave at 15 MPa, and methanol and water are removed from the silica particle dispersion liquid (A). When an amount of carbon dioxide supplied into the autoclave reaches 900 parts, supply of carbon dioxide is stopped and a powder of silica particles is obtained.

In a state where the inside of the autoclave is maintained at 150° C. and 15 MPa by the heater and the pump to maintain the supercritical state of carbon dioxide, 50 parts of hexamethyldisilazane relative to 100 parts of silica particles is injected into the autoclave by an entrainer pump while the stirrer of the autoclave is continuously rotated, the temperature inside the autoclave is raised to 180° C., and a reaction is performed for 20 minutes. Next, the supercritical carbon dioxide is circulated again in the autoclave, and excess hexamethyldisilazane is removed. Next, stirring is stopped, the pressure valve is opened to release the pressure in the autoclave to atmospheric pressure, and the temperature is lowered to room temperature (25° C.). In this way, silica particle (2) surface-treated with the hexamethyldisilazane is obtained. The silica particle (2) has a volume average particle diameter of 4 nm.

<<Silica Particle (3)>>

In the same manner as the preparation of the silica particle (2) except that the amounts of the tetramethoxysilane and the 7.6% ammonia water dropped for the preparation of the silica particle dispersion liquid (A) are increased to change the volume average particle diameter of the silica particles in the silica particle dispersion liquid to 6 nm, and silica particle (3) surface-treated with the hexamethyldisilazane is obtained. The silica particle (3) has a volume average particle diameter of 7 nm.

<<Silica Particle (4)>>

Commercially available hydrophobic silica particles (fumed silica particles surface-treated with hexamethyldisilazane, volume average particle diameter: 12 nm) are prepared as the silica particle (4).

<<Silica Particle (5)>>

Commercially available hydrophilic silica particles (fumed silica particles, without surface treatment, volume average particle diameter: 62 nm) are prepared as the silica particle (5).

<<Silica Particle (6)>>

Commercially available hydrophobic silica particles (fumed silica particles surface-treated with hexamethyldisilazane, volume average particle diameter: 88 nm) are prepared as the silica particle (6).

<<Silica Particle (7)>>

Commercially available hydrophobic silica particles (fumed silica particles surface-treated with hexamethyldisilazane, volume average particle diameter: 93 nm) are prepared as the silica particle (7).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An electrostatic charge image developing carrier comprising:

a magnetic particle; and a coating resin layer that covers the magnetic particle and contains a silica particle as an internal additive, wherein a ratio of Si on a surface of the coating resin layer, determined by an X-ray photoelectron spectroscopy (XPS), is 6 atom % or more and 12 atom % or less;

an average particle diameter of the silica particle is 5 nm or more and 70 nm or less;

a content of the silica particle is 25 mass % or more and 45 mass % or less relative to a total mass of the coating resin layer;

an average thickness of the coating resin layer is 0.6 μm or more and 1.4 μm or less; and an average length RSm of a roughness curve element of a surface of the carrier is 0.5 μm or more and 0.8 μm or less;

an arithmetic average height Ra of a roughness curve of the surface of the carrier is 0.1 μm or more and 1.0 μm or less; and the arithmetic average height Ra of the roughness curve of the surface of the carrier is different from an arithmetic average height of a roughness curve of a surface of the magnetic particle.

2. The electrostatic charge image developing carrier according claim 1, wherein the ratio of the average particle diameter of the silica particle to the average thickness of the coating resin layer (average particle diameter of silica particle/average thickness of coating resin layer) is 0.007 or more and 0.05 or less.

3. The electrostatic charge image developing carrier according to claim 1, wherein a weight average molecular weight of a resin contained in the coating resin layer is less than 300,000.

4. The electrostatic charge image developing carrier according to claim 3, wherein the weight average molecular weight of the resin contained in the coating resin layer is less than 250,000.

5. An electrostatic charge image developer comprising:

an electrostatic charge image developing toner; and the electrostatic charge image developing carrier according to claim 1.

6. A process cartridge detachable from an image forming apparatus, the process cartridge comprising:

a developing unit that accommodates the electrostatic charge image developer according to claim 5 and develops an electrostatic charge image formed on a surface of an image carrier as a toner image by the electrostatic charge image developer.

7. An image forming apparatus comprising:

an image carrier;

a charging unit that charges a surface of the image carrier;

an electrostatic charge image forming unit that forms an electrostatic charge image on the charged surface of the image carrier;

a developing unit that accommodates the electrostatic charge image developer according to claim 5 and develops the electrostatic charge image formed on the surface of the image carrier as a toner image by the electrostatic charge image developer;

a transfer unit that transfers the toner image formed on the surface of the image carrier to a surface of a recording medium; and a fixing unit that fixes the toner image transferred to the surface of the recording medium.

8. An image forming method comprising:

charging a surface of an image carrier;

forming an electrostatic charge image on the charged surface of the image carrier;

developing the electrostatic charge image formed on the surface of the image carrier as a toner image using the electrostatic charge image developer according to claim 5;

transferring the toner image formed on the surface of the image carrier to a surface of a recording medium; and fixing the toner image transferred to the surface of the recording medium.

* * * * *